(12) United States Patent
Padegimaite et al.

(10) Patent No.: US 12,306,004 B2
(45) Date of Patent: *May 20, 2025

(54) CONTEXT AWARE NAVIGATION VOICE ASSISTANT

(71) Applicant: GOOGLE LLC, Mountain View, CA (US)

(72) Inventors: Migle Padegimaite, Mountain View, CA (US); Sammy El Ghazzal, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,204

(22) Filed: Jun. 11, 2024

(65) Prior Publication Data

US 2024/0328807 A1 Oct. 3, 2024

Related U.S. Application Data

(63) Continuation of application No. 18/213,027, filed on Jun. 22, 2023, now Pat. No. 12,038,300, which is a
(Continued)

(51) Int. Cl.
*G01C 21/36* (2006.01)
*G06N 20/20* (2019.01)

(52) U.S. Cl.
CPC ..... *G01C 21/3629* (2013.01); *G01C 21/3608* (2013.01); *G01C 21/3644* (2013.01); *G01C 21/3691* (2013.01); *G06N 20/20* (2019.01)

(58) Field of Classification Search
CPC ............ G01C 21/3629; G01C 21/3608; G01C 21/3644; G01C 21/3691; G06N 20/20
See application file for complete search history.

(56) References Cited

U.S. PATENT DOCUMENTS 6,212,474 B1 4/2001 Fowler et al.
6,353,814 B1 3/2002 Weng
(Continued)

FOREIGN PATENT DOCUMENTS

CN 103077624 A 5/2013
CN 105136156 A 12/2015
(Continued)

OTHER PUBLICATIONS

Server Management: by Gilbert Held, published 2000 (an electronic textbook available at https://books.google.com/) (Note: A copy of this textbook is not being provided with this office action). (2000).
(Continued)

*Primary Examiner* — Aryan E Weisenfeld
(74) *Attorney, Agent, or Firm* — Lerner David LLP

(57) ABSTRACT

To provide context-aware audio navigation instructions, a server device obtains sets of audio navigation instructions previously provided to users along with sensor data descriptive of a context in which the audio navigation instructions were provided and an indication of whether a driver correctly responded to the audio navigation instructions. The server device trains a machine learning model using this data, where the machine learning model identifies audio navigation instruction parameters for a particular context. In response to a request for navigation directions, the server device receives sensor data from the client computing device generating the request that is indicative of the environment surrounding the client computing device. The server device then applies the sensor data and navigation instructions to the machine learning model to generate a set of audio navigation instructions responsive to the request. The server device provides the set of audio navigation instructions to the client computing device.

20 Claims, 6 Drawing Sheets

Related U.S. Application Data continuation of application No. 16/606,579, filed as application No. PCT/US2018/058941 on Nov. 2, 2018, now Pat. No. 11,725,957.

(56) References Cited

U.S. PATENT DOCUMENTS

| | | |
|---|---|---|
| 9,082,239 B2 | 7/2015 | Ricci |
| 2003/0144846 A1 | 7/2003 | Denenberg et al. |
| 2007/0078596 A1 | 4/2007 | Grace |
| 2008/0221792 A1 | 9/2008 | Nakayama |
| 2008/0262717 A1 | 10/2008 | Ettinger et al. |
| 2009/0157294 A1 | 6/2009 | Geelen et al. |
| 2009/0306989 A1 | 12/2009 | Kaji |
| 2010/0324818 A1 | 12/2010 | Gellatly et al. |
| 2013/0197798 A1 | 8/2013 | Clark et al. |
| 2013/0311081 A1 | 11/2013 | Yamakawa et al. |
| 2014/0005922 A1 | 1/2014 | Bank et al. |
| 2014/0195143 A1 | 7/2014 | Kandangath et al. |
| 2014/0214322 A1 | 7/2014 | Tsimhoni et al. |
| 2014/0309935 A1 | 10/2014 | Ricci |
| 2015/0276421 A1 | 10/2015 | Beaurepaire et al. |
| 2019/0293440 A1 | 9/2019 | Hasemann et al. |

FOREIGN PATENT DOCUMENTS

| | | |
|---|---|---|
| CN | 106062514 A | 10/2016 |
| JP | 2013-086754 A | 5/2013 |
| WO | WO-2015/103457 A2 | 7/2015 |
| WO | WO-2018/024703 A1 | 2/2018 |

OTHER PUBLICATIONS

Why Deep Learning Over Traditional Machine Learning: by Sambit Mahapatra. Published on Mar. 21, 2018 at https:// towardsdatascience. conn (2018).

First Examination Report for India Application No. 202047054510, dated Dec. 24, 2021.

International Search Report and Written Opinion for Application No. PCT/US2018/058941, dated Jul. 10, 2019.

Office Action for Japanese Application No. 2020-568399, dated Dec. 20, 2021.

Office Action for Korean Application No. 10-2020-7037475, dated Jun. 28, 2022.

Office Action for Korean Application No. 10-2023-7020645, dated Aug. 17, 2023.

Office Action for Chinese Application No. 201880095260.8, dated Jan. 18, 2024.

Office Action for European Application No. 18812421.8, dated Apr. 5, 2024.

300

| Audio Navigation Instruction Parameters 310 | | | | Context Signals 320 | | | | Results 330 | |
| --- | --- | --- | --- | --- | --- | --- | --- | --- | --- |
| Level of Detail 302 | Timing 304 | Volume 306 | Location 308 | Traffic 312 | Weather 314 | Time of Day 316 | Noise 318 | Driver Followed Instruction? 320 | Driver Was Satisfied With Instruction? 322 |
| High | 1X | Low | 8.501, 47.363 | Heavy | Sunny | Morning | Loud | Yes | Yes |
| Medium | 2X | Low | 8.544, 47.376 | Light | Raining | Evening | Quiet | Yes | No |
| High | 1X | Medium | 8.567, 47.321 | Heavy | Sunny | Afternoon | Quiet | Yes | Yes |
| Low | 3X | High | 8.524, 47.365 | Light | Overcast | Night | Quiet | No | Yes |
| Low | 1X | Medium | 8.528, 47.361 | Medium | Snowing | Evening | Loud | No | No |

FIG. 3

CONTEXT AWARE NAVIGATION VOICE ASSISTANT

CROSS-REFERENCE TO RELATED APPLICATION

The present application is a continuation of and claims priority to U.S. application Ser. No. 18/213,027, filed Jun. 22, 2023, entitled "Context Aware Navigation Voice Assistant," which is a continuation of and claims priority to U.S. application Ser. No. 16/606,579, filed Oct. 18, 2019, entitled "Context Aware Navigation Voice Assistant," the disclosure of which is incorporated herein by reference in its entirety for all purposes.

FIELD OF THE DISCLOSURE

The present disclosure relates to context-aware audio navigation instructions and, more particularly, to using machine learning techniques to identify optimal parameters for audio navigation instructions based on the context.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, software applications executing in computers, smartphones, etc. or embedded devices generate step-by-step navigation directions. Typically, a user specifies the starting point and the destination, and a software application displays and/or presents the directions in an audio format immediately and/or as the user travels from the starting point and the destination.

These software applications generally utilize indications of distance, street names, building numbers, to generate navigation directions based on the route. For example, these systems can provide to a driver such instructions as "proceed for one-fourth of a mile, then turn right onto Maple Street."

SUMMARY

To generate context-aware audio navigation instructions, a context-aware audio navigation generation system utilizes machine learning techniques to generate a machine learning model based on users' past experiences with audio navigation directions given the context. For example, in one instance a user may have been unable to follow an audio navigation instruction when the radio was playing too loudly or a truck passed by. In another instance, a user may have been unable to follow an audio navigation instruction when the street sign for an upcoming maneuver was difficult to see or visibility was poor due to the time of night and/or weather conditions.

Accordingly, the context-aware audio navigation generation system collects sets of audio navigation instructions provided to users along with context data from sensors in the vehicles in which the audio navigation instructions were provided. For each audio navigation instruction provided to a user, the context-aware audio navigation generation system collects an indication of whether the user correctly followed the audio navigation instruction. This information is then used as training data to train the machine learning model to identify optimal audio navigation instruction parameters for a particular context. For example, when the noise in the vehicle is low, traffic is light, and visibility is poor due to the time of day or weather conditions, the machine learning model may determine that an audio navigation instruction should be presented twice at a low volume and with a high level of detail, such as "In 500 feet, turn left just past the stoplight on Main Street," and "In 100 feet, turn left just past the stoplight on Main Street."

When a user requests navigation directions, the context-aware audio navigation generation system generates a set of turn-by-turn navigation instructions and obtains sensor data from the user's vehicle indicative of the context. For each text-based navigation instruction, the context-aware audio navigation generation system applies the sensor data and the text-based navigation instruction to the machine learning model to generate audio navigation instruction parameters, such as a level of detail, a timing, and/or a volume for presenting the audio navigation instruction. Then the context-aware audio navigation generation system presents each audio navigation instruction to the user according to the determined audio navigation instruction parameters.

One example embodiment of the techniques of this disclosure is a method for generating context-aware audio navigation instructions in a vehicle. The method includes training a machine learning model using (i) a plurality of sensor signals in the vehicle, the sensor signals being descriptive of a context in which audio navigation instructions are provided, and (ii) an indication of whether a driver correctly responded to the audio navigation instructions, and determining a navigation instruction to be provided to the driver. The method further includes generating an audio navigation instruction based on the determined navigation instruction, including receiving one or more sensor signals, and applying the machine learning model to the determined navigation instruction and the received one or more sensor signals to generate at least one of (i) a level of detail of the audio navigation instruction, (ii) a timing of providing the audio navigation instruction, or (iii) a volume of the audio navigation instruction. Additionally, the method includes providing the audio navigation instruction for presentation to the driver via a speaker.

Another example embodiment is a server device for generating context-aware audio navigation instructions in a vehicle, where the server device includes one or more processors and a non-transitory computer-readable memory coupled to the one or more processors and storing thereon instructions. The instructions, when executed by the one or more processors, cause the server device to train a machine learning model using (i) a plurality of sensor signals in the vehicle, the sensor signals being descriptive of a context in which audio navigation instructions are provided, and (ii) an indication of whether a driver correctly responded to the audio navigation instructions. The instructions further cause the server device to determine a navigation instruction to be provided to the driver, generate an audio navigation instruction based on the determined navigation instruction, including receive one or more sensor signals, and apply the machine learning model to the determined navigation instruction and the received one or more sensor signals to generate at least one of (i) a level of detail of the audio navigation instruction, (ii) a timing of providing the audio navigation instruction, or (iii) a volume of the audio navigation instruction. Moreover, the instructions cause the server device to provide the audio navigation instruction for presentation to the driver via a speaker.

Yet another example embodiment is a client device for presenting context-aware audio navigation instructions in a vehicle, where the client device includes one or more processors and a non-transitory computer-readable memory coupled to the one or more processors and storing thereon instructions. The instructions, when executed by the one or more processors, cause the client device to in a first instance: provide a request for navigation directions from a first starting location to a first destination, provide a first set of sensor signals in a vehicle, receive a first set of audio navigation instructions including a first audio navigation instruction having a particular level of detail which is to be presented with a particular timing or volume, and present, via a speaker, the first set of audio navigation instructions. In a second instance, the instructions cause the client device to provide a request for navigation directions from a second starting location to a second destination, provide a second set of sensor signals in a vehicle, receive a second set of audio navigation instructions including the first audio navigation instruction having a same orientation, location, or maneuver as in the first instance and having a different level of detail than in the first instance or wherein the first audio navigation instruction is to be presented with a different timing or volume than in the first instance, and present, via a speaker, the second set of audio navigation instructions.

BRIEF DESCRIPTION OF THE DRAWINGS

FIG. 3 is an example navigation instruction data table which the context-aware audio navigation generation system of FIG. 2 can utilize to generate a machine learning model for identifying audio navigation instruction parameters for a particular context;

DETAILED DESCRIPTION

Overview

Audio instructions provided by in-vehicle navigation systems generally have to be informative and provide sufficient instruction for the route to be followed but without unnecessarily distracting those listening, particularly the driver. As the environment changes, then the optimal parameters for such audio instructions may also change. The environment may change over relatively short time frames, thus the speed with which the parameters can be changed may be significant. Furthermore, users, particularly drivers, may be limited in the range of manual input operations that they can perform such that manual adjustment of audio parameters may be undesirable. As such, an improved system-user audio interface may be beneficial.

In some embodiments, sensors can be leveraged to provide indications of the context in which the audio navigation instructions are being supplied. As an example, an audio sensor for detecting noise may be used to provide context in the form of background noise, such as traffic noise, talking, music playing, and the like. As another example, traffic data may be obtained and/or weather conditions and the time of day may be determined to provide context on the traffic and weather around the vehicle, which may be indicative of the attention that the driver is having to give to driving, which in turn may affect the attention that the driver can give to the audio navigation instructions. In some embodiments, a machine learning model may be applied to determine parameters of the audio navigation instructions to adapt the audio instructions output by a speaker or other audio system depending on the context derived from the sensors. This may result in the audio navigation instructions output by the speaker or other audio system being dynamically and automatically adapted to the present context on the fly, without placing an undue burden on the user and/or without undue lag.

In embodiments, an indication of whether a driver correctly responded to the audio navigation instructions can be determined (e.g., based on the position of the vehicle relative to an expected position according to the navigation directions), which can be used along with the associated sensor signals to train the machine learning model. This may allow the model to be dynamically updated, which may improve the automatic adaptation of the parameters of the audio navigation instructions, particularly in relation to contexts in which a particular navigation system is exposed.

Example Hardware and Software Components

Figure 1:
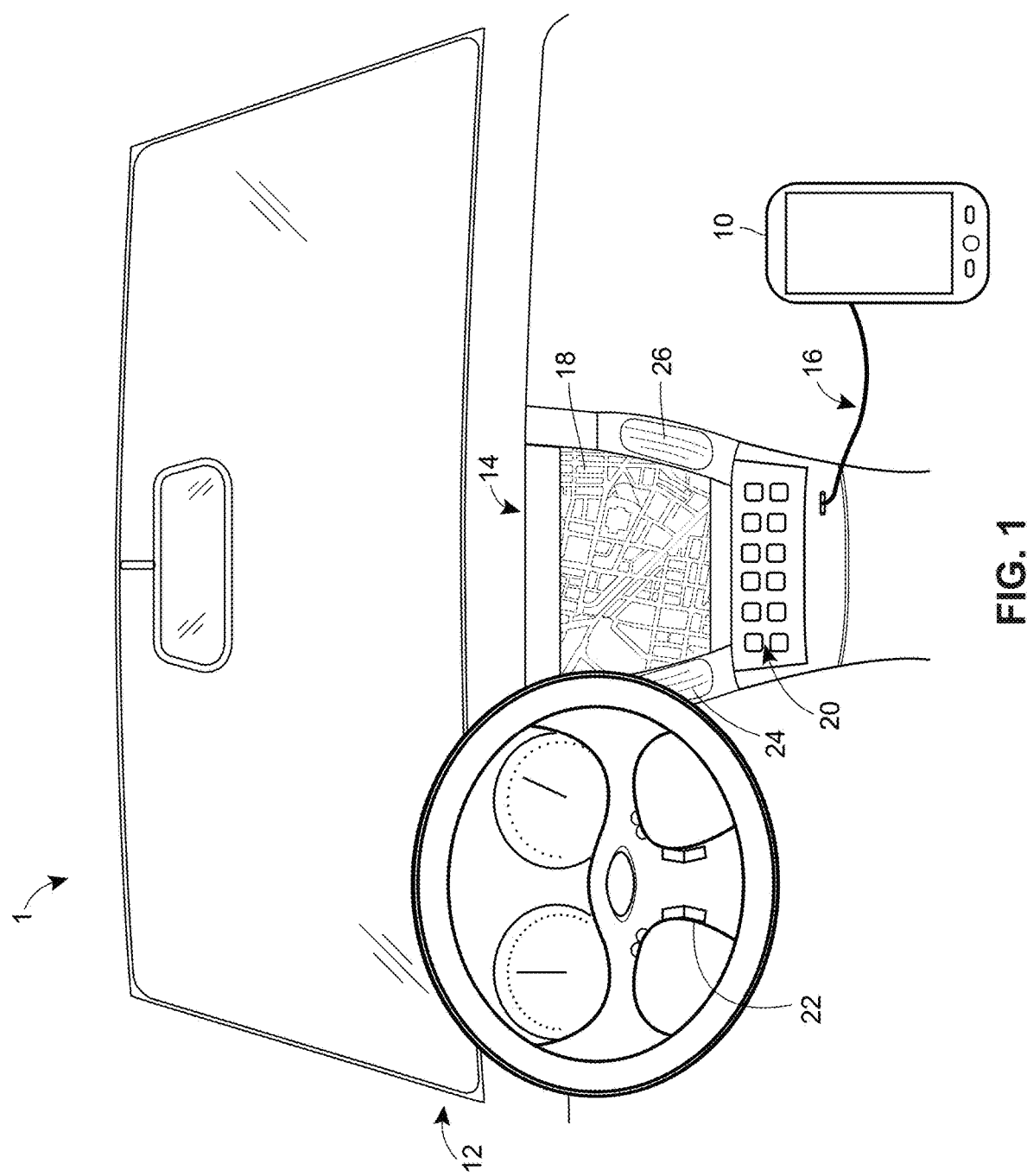
FIG. 1 illustrates an example vehicle in which the techniques of the present disclosure can be used to generate context-aware audio navigation instructions.

Referring to FIG. 1, an example environment 1 in which the techniques outlined above can be implemented includes a portable device 10 and a vehicle 12 with a head unit 14. The portable device 10 may be a smart phone, a tablet computer, or an in-vehicle navigation system, for example. The portable device 10 communicates with the head unit 14 of the vehicle 12 via a communication link 16, which may be wired (e.g., Universal Serial Bus (USB)) or wireless (e.g., Bluetooth, Wi-Fi Direct). The portable device 10 also can communicate with various content providers, servers, etc. via a wireless communication network such as a fourth- or third-generation cellular network (4G or 3G, respectively).

The head unit 14 can include a display 18 for presenting navigation information such as a digital map. The display 18 in some implementations is a touchscreen and includes a software keyboard for entering text input, which may include the name or address of a destination, point of origin, etc. Hardware input controls 20 and 22 on the head unit 14 and the steering wheel, respectively, can be used for entering alphanumeric characters or to perform other functions for requesting navigation directions. The head unit 14 also can include audio input and output components such as a microphone 24 and speakers 26, for example. The speakers 26 can be used to play the audio instructions sent from the portable device 10.

Figure 2:
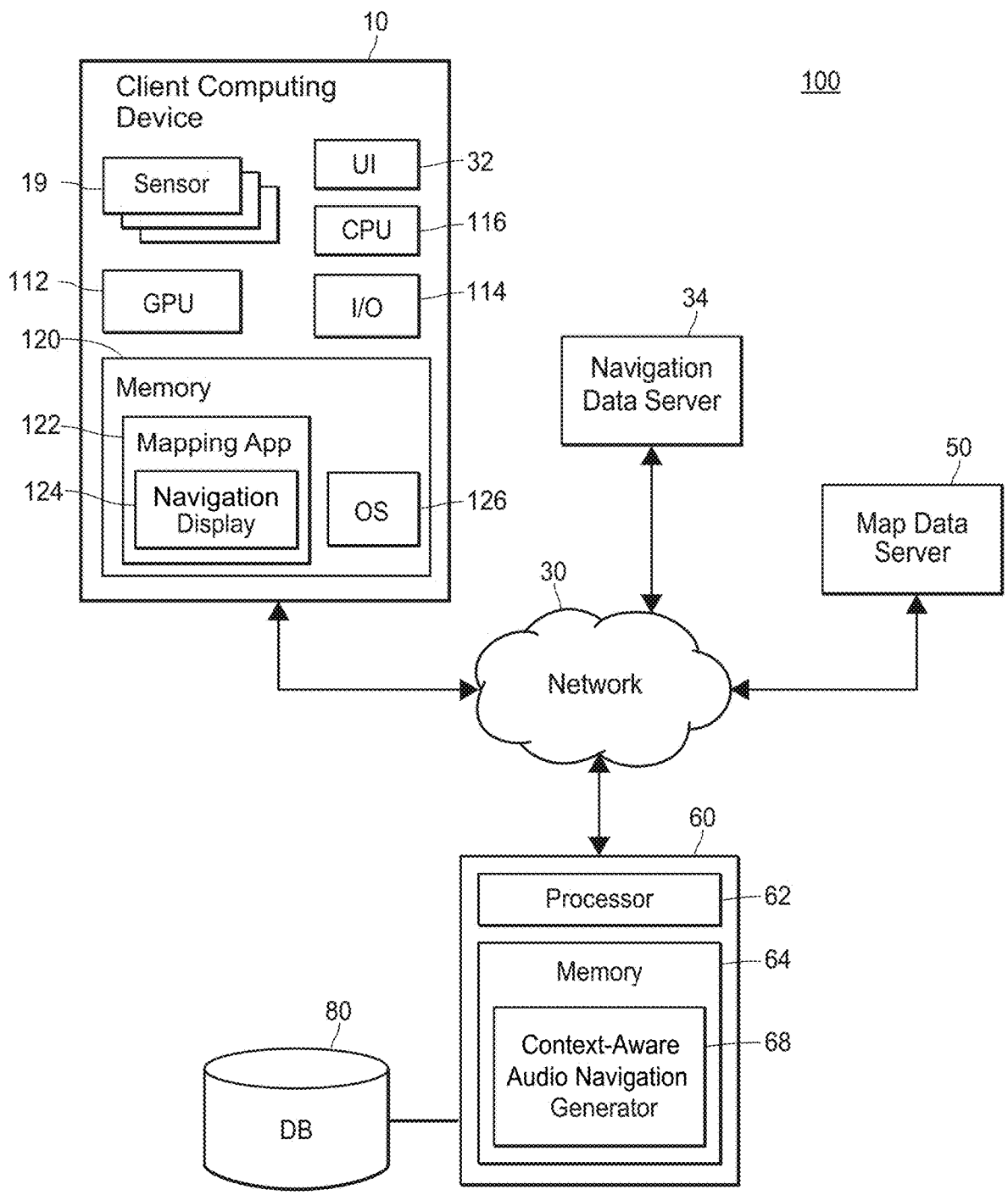
FIG. 2 is a block diagram of an example system in which techniques for generating context-aware audio navigation instructions using machine learning techniques can be implemented.

An example communication system 100 in which a context-aware audio navigation generation system can be implemented is illustrated in FIG. 2. The communication system 100 includes a client computing device 10 configured to execute a geographic application 122, which also can be referred to as "mapping application 122." Depending on the implementation, the application 122 can display an interactive digital map, request and receive routing data to provide driving, walking, or other navigation directions including audio navigation directions, provide various geolocated content, etc. The client computing device 10 may be operated by a user (also referred to herein as a "driver") displaying a digital map while navigating to various locations.

In addition to the client computing device 10, the communication system 100 includes a server device 60 configured to provide context-aware audio navigation instructions to the client device 10. The server device 60 can be communicatively coupled to a database 80 that stores, in an example implementation, a machine learning model for generating the audio navigation instructions in addition to training data for training the machine learning model. The training data may include sets of audio navigation instructions provided to users including parameters for each audio navigation instruction, such as a level of detail for the audio navigation instruction, a timing of the audio navigation instruction, a volume of the audio navigation instruction, etc. Additionally, for each audio navigation instruction, the training data may include sensor data from the vehicle of the user who received the audio navigation instruction. The sensor data may be descriptive of the context in which the audio navigation instructions are provided. Sensor data may include traffic data for the area surrounding the user's vehicle, visibility data such as the time of day, weather data for the area surrounding the user's vehicle, and/or location data indicative of the user's current location when an audio navigation instruction was presented, audio data indicative of the noise level in or around the vehicle, such as background music or talking in the vehicle, street noise, honking, a phone ringing, etc. Still further, for each audio navigation instruction, the training data may include an indication of whether the user correctly followed or responded to the audio navigation instruction and/or a self-reported indication regarding the user's satisfaction with the audio navigation instruction. The training data is described in further detail below with reference to FIG. 3.

More generally, the server device 60 can communicate with one or several databases that store any type of suitable geospatial information or information that can be linked to a geographic context. The communication system 100 also can include a navigation data server 34 that provides driving, walking, biking, or public transit directions, for example. Further, the communication system 100 can include a map data server 50 that provides map data to the server device 60 for generating a map display. The devices operating in the communication system 100 can be interconnected via a communication network 30.

In various implementations, the client computing device 10 may be a smartphone or a tablet computer. The client computing device 10 may include a memory 120, one or more processors (CPUs) 116, a graphics processing unit (GPU) 112, an I/O module 14 including a microphone and speakers, a user interface (UI) 32, and one or several sensors 19 including a Global Positioning Service (GPS) module. The memory 120 can be a non-transitory memory and can include one or several suitable memory modules, such as random access memory (RAM), read-only memory (ROM), flash memory, other types of persistent memory, etc. The I/O module 114 may be a touch screen, for example. In various implementations, the client computing device 10 can include fewer components than illustrated in FIG. 2 or conversely, additional components. In other embodiments, the client computing device 10 may be any suitable portable or non-portable computing device. For example, the client computing device 10 may be a laptop computer, a desktop computer, a wearable device such as a smart watch or smart glasses, etc.

The memory 120 stores an operating system (OS) 126, which can be any type of suitable mobile or general-purpose operating system. The OS 126 can include application programming interface (API) functions that allow applications to retrieve sensor readings. For example, a software application configured to execute on the computing device 10 can include instructions that invoke an OS 126 API for retrieving a current location of the client computing device 10 at that instant. The API can also return a quantitative indication of how certain the API is of the estimate (e.g., as a percentage).

The memory 120 also stores a mapping application 122, which is configured to generate interactive digital maps and/or perform other geographic functions, as indicated above. The mapping application 122 can receive navigation instructions, audio navigation instructions, and/or audio navigation instruction parameters and present the audio navigation instructions according to the audio navigation instruction parameters via the navigation display 124. The mapping application 122 also can display driving, walking, or transit directions, and in general provide functions related to geography, geolocation, navigation, etc. via the navigation display 124.

It is noted that although FIG. 2 illustrates the mapping application 122 as a standalone application, the functionality of the mapping application 122 also can be provided in the form of an online service accessible via a web browser executing on the client computing device 10, as a plug-in or extension for another software application executing on the client computing device 10, etc. The mapping application 122 generally can be provided in different versions for different respective operating systems. For example, the maker of the client computing device 10 can provide a Software Development Kit (SDK) including the mapping application 122 for the Android™ platform, another SDK for the iOS™ platform, etc.

In some implementations, the server device 60 includes one or more processors 62 and a memory 64. The memory 64 may be tangible, non-transitory memory and may include any types of suitable memory modules, including random access memory (RAM), read-only memory (ROM), flash memory, other types of persistent memory, etc. The memory 64 stores instructions executable on the processors 62 that make up a context-aware audio navigation generator 68, which can generate a machine learning model for identifying audio navigation instruction parameters for a particular context. The context-aware audio navigation generator 68 may also receive a request for navigation directions for a user from a starting location to a destination along with sensor data descriptive of a context of the external environment surrounding the user. The context-aware audio navigation generator 68 may then retrieve text-based navigation instructions and apply the text-based navigation instructions and the sensor data to the machine learning model to generate audio navigation instructions. Additionally, the context-aware audio navigation generator 68 may provide the audio navigation instructions to the client computing device 10 which are then presented by the navigation display 124 via a speaker 26. In some embodiments, the context-aware audio navigation generator 68 includes a machine learning engine described in more detail below.

The context-aware audio navigation generator 68 and the navigation display 124 can operate as components of a context-aware audio navigation generation system. Alternatively, the context-aware audio navigation generation system can include only server-side components and simply provide the navigation display 124 with instructions to present the audio navigation instructions. In other words, context-aware audio navigation generation techniques in these embodiments can be implemented transparently to the navigation display 124. As another alternative, the entire functionality of the context-aware audio navigation generator 68 can be implemented in the navigation display 124.

For simplicity, FIG. 2 illustrates the server device 60 as only one instance of a server. However, the server device 60 according to some implementations includes a group of one or more server devices, each equipped with one or more processors and capable of operating independently of the other server devices. Server devices operating in such a group can process requests from the organization/advertiser computing device 10 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

In operation, the navigation display 124 operating in the client computing device 10 receives and transmits data to the server device 60. Thus, in one example, the client computing device 10 may transmit a communication to the context-aware audio navigation generator 68 (implemented in the server device 60) including sensor data indicative of the environment surrounding the client computing device 10 and requesting navigation directions from a starting location to a destination. Accordingly, the context-aware audio navigation generator 68 may apply the data included in the request to a machine learning model for identifying audio navigation instruction parameters for a particular context to generate a set of audio navigation instructions.

For example, a user may request navigation directions from the user's current location to a particular restaurant. The client computing device 10 may also provide sensor data to the server device 60 including an indication of daytime with light traffic, sunny weather, and a high noise level due to street noise. As a result, the context-aware audio navigation generator 68 may determine that the first audio navigation instruction should have a low level of detail, and should be presented three times at a high volume. The context-aware audio navigation generator 68 may then generate the first audio navigation instruction as, "In X feet, turn right on Main Street," to be presented three times each at high volume as the user approaches Main Street with X being an updated distance from the user's current location to Main Street.

The context-aware audio navigation generator 68 may provide the first audio navigation instruction and/or audio navigation instruction parameters to the client computing device 10. The client computing device 10 may then present the first audio navigation instruction via a speaker 26. In some embodiments, the context-aware audio navigation generator 68 generates and provides each audio navigation instruction individually to the client computing device 10. In other embodiments, the context-aware audio navigation generator 68 generates and provides a set of text-based navigation instructions to the client computing device 10. Then for each text-based navigation instruction, the context-aware audio navigation generator 68 receives sensor data from the client computing device 10 and generates and provides audio navigation instruction parameters for the text-based navigation instruction to the client computing device 10. As a result, the client computing device 10 generates and presents an audio navigation instruction according to the audio navigation instruction parameters.

Also in some embodiments, the context-aware audio navigation generator 68 generates and provides a set of text-based navigation instructions including multiple versions of the same navigation instruction to the client computing device 10 (e.g., a first version of the navigation instruction at a low level of detail, a second version of the navigation instruction at a medium level of detail, and a third version of the navigation instruction at a high level of detail). Then for each navigation instruction, the context-aware audio navigation generator 68 generates and provides audio navigation instruction parameters for the navigation instruction to the client computing device 10. As a result, the client computing device 10 presents the version of the navigation instruction that corresponds to the audio navigation instruction parameters.

To generate the machine learning model for identifying audio navigation instruction parameters for a particular context, the context-aware audio navigation generator 68 obtains training data including sets of audio navigation instructions previously provided to users and/or audio navigation instruction parameters for each audio navigation instruction previously provided to a user.

For example, users who select an option to share location data and/or other user data may transmit sets of audio navigation instructions presented by their respective client computing devices 10 along with sensor data from their respective client computing devices 10 collected when the audio navigation instructions were presented. The sensor data may include for each audio navigation instruction, the amount of traffic when the audio navigation instruction was presented, the time of day when the audio navigation instruction was presented, weather conditions when the audio navigation instruction was presented, the noise level when the audio navigation instruction was presented, the user's current location when the audio navigation instruction was presented, etc. In some embodiments, the client computing device 10 determines the time of day and noise level via a clock and microphone, respectively, included in the client computing device 10. To determine the weather, the client computing device 10 may include a rain sensor or may communicate with an external service such as the National Weather service. For example, the client computing device 10 may communicate with the GPS module to obtain a current location and transmit a request to the National Weather service for weather data for a region that includes the current location. Likewise to determine the amount of traffic, the client computing device 10 may communicate with the GPS module to obtain a current location and transmit a request to a traffic service for traffic data for a region that includes the current location.

In any event, for each audio navigation instruction presented, the context-aware audio navigation generator 68 obtains the sensor data and an indication of whether the user correctly followed the audio navigation instruction. For example, if the mapping application 122 generated a new route because the user's current location differed from the path of the original route after the audio navigation instruction was presented, the context-aware audio navigation generator 68 may receive an indication that the user did not correctly follow the audio navigation instruction. Also in some embodiments, the context-aware audio navigation generator 68 may obtain a self-reported indication regarding the user's satisfaction with the audio navigation instruction as additional training data. For example, the mapping application 122 may include a user control to indicate dissatisfaction with an audio navigation instruction and/or a text field for the user to explain her dissatisfaction. In this manner, the machine learning model can generate audio navigation instructions that are more likely to be followed and less likely to annoy or disturb the user.

The sets of audio navigation instructions, audio navigation instruction parameters, sensor data, and indications of whether a user correctly followed an audio navigation instruction and/or was satisfied with an audio navigation instruction may be provided as training data for generating the machine learning model using machine learning techniques. In some embodiments, separate machine learning models may be generated for each audio navigation instruction parameter. For example, one machine learning model may be generated for determining the level of detail for an audio navigation instruction. Another machine learning model may be generated for determining the timing of providing the audio navigation instruction. Yet another machine learning model may be generated for determining the volume for the audio navigation instruction.

Example Training Data for Generating the Machine Learning Model

FIG. 3 illustrates example training data 300 that may be used to generate the machine learning model. In some embodiments, the training data 300 may be stored in the database 80. The training data 300 may include three portions: audio navigation instruction parameters 310, context signals from sensor data 320, and driver response to the audio navigation instruction 330. The audio navigation instruction parameters 310 may include the level of detail of the audio navigation instruction 302, the timing of the audio navigation instruction 304, and the volume of the navigation instruction 306. The level of detail may be high, medium, or low where an audio navigation instruction at a low level of detail includes for example, a maneuver (e.g., "Turn left") and a street name as a location for the maneuver (e.g., State Street). In some embodiments, an audio navigation instruction at a low level of detail does not include a component describing the distance from the user's current location to the location for the maneuver (e.g., "In 500 feet"). An audio navigation instruction at a medium level of detail includes for example, a maneuver (e.g., "Turn left"), a street name or intersection as a location for the maneuver (e.g., State Street), and a component describing the distance from the user's current location to the location for the maneuver (e.g., "In 500 feet"). An audio navigation instruction at a high level of detail includes for example, a landmark as a location for the maneuver (e.g., "Turn right at Joe's Restaurant"), a description of traffic signals related to the location for the maneuver (e.g., "In 1000 feet, after passing two stoplights, turn left onto State Street," "Make a slight right at the next stop sign next to Jim's Repair Shop"), a component describing an estimated amount of time until the user reaches the location for the maneuver (e.g., "In 500 feet or about 30 seconds, turn left"), any suitable combination of these, or any suitable audio navigation instruction including more detail than the medium level of detail.

The timing of the audio navigation instruction 304 may indicate the number of times or frequency in which multiple instances of the audio navigation instruction 304 were presented (e.g., multiple instances of a similar audio navigation instruction 304 including the same maneuver and location but varying distances or estimated amounts of time to the location as the driver approaches the location). The timing of the audio navigation instruction 304 may also indicate when to present the audio navigation instruction(s) 304, such as when the user is halfway between the location of the previous maneuver and the location of the subsequent maneuver. The volume 306 may be indicated in decibels (dB) or categorized as low volume (e.g., below a first threshold decibel amount), medium volume (e.g., between the first threshold decibel amount and a second threshold decibel amount that is higher than the first threshold decibel amount), high volume (e.g., above the second threshold decibel amount), etc.

The context signals from sensor data 320 may include visibility data, such as the location 308, weather conditions 314, and time of day 316 in which the audio navigation instruction was provided. In some locations, a street sign may be obstructed, in a position that is difficult to see, or may be placed in close proximity with another street sign thus causing users to assume the street for a maneuver is farther away. While the location column 308 in the data table 300 includes GPS coordinates, the location may be an intersection, street address, or any other suitable location. Additionally, the time of day 316 may include the exact time in which the audio navigation instruction was provided (e.g., 9:15 p.m.) or may include a time frame, such as morning, afternoon, evening, and night.

The context signals from sensor data 320 may also include traffic data 312 categorized as light traffic, medium traffic, or heavy traffic. For example, light traffic for a road may indicate that vehicles on the road are traveling at or above the speed limit. Medium traffic for a road may indicate that vehicles on the road are traveling within a threshold speed below the speed limit (e.g., within 5-10 mph of the speed limit). Heavy traffic for a road may indicate that vehicles on the road are traveling at less than a threshold speed (e.g., less than 5-10 mph).

Furthermore, the context signals from sensor data 320 may include audio data 318 indicating the noise level in or around the vehicle, such as background music or talking in the vehicle, street noise, honking, a phone ringing, etc. The noise 318 may be indicated in decibels (dB) or categorized as quiet (e.g., below a first threshold decibel amount), medium (e.g., between the first threshold decibel amount and a second threshold decibel amount that is higher than the first threshold decibel amount), loud (e.g., above the second threshold decibel amount), etc. In some embodiments, the audio data 318 may also include an indication of the source of the noise, such as the radio or other music playing, street noise, etc. While the example training data 300 includes location data 308, traffic data 312, weather data 314, the time of day 316, and audio data 318 as context signals 320, these are merely a few examples of context signals for ease of illustration only. Any suitable sensor data indicative of the environment surrounding the client computing device 10 may be used as context signals 320.

In addition to audio navigation instruction parameters 310 and context signals from sensor data 320, the training data 300 may include data indicative of the driver's response to the audio navigation instruction 330. The data indicative of the driver's response to the audio navigation instruction 330 may include an indication of whether the driver correctly followed the audio navigation instruction 320. For example, if the mapping application 122 generated a new route because the user's current location differed from the path of the original route after the audio navigation instruction was presented, the context-aware audio navigation generator 68 may receive an indication that the user did not correctly follow the audio navigation instruction. The data indicative of the driver's response to the audio navigation instruction 330 may also include a self-reported indication regarding the user's satisfaction 322 with the audio navigation instruction. For example, the mapping application 122 may include a user control to indicate dissatisfaction with an audio navigation instruction and/or a text field for the user to explain her dissatisfaction.

To generate the machine learning model, the context-aware audio navigation generator 68 may classify subsets of the training data 300 as corresponding to an audio navigation instruction in which the driver correctly responded/was satisfied or corresponding to an audio navigation instruction in which the driver did not correctly respond or was not satisfied. For example, the first row of training data 300 (having a high level of detail that was played one time at a low volume at a location with GPS coordinates 8.501, 47.363, provided in heavy traffic during the morning with sunny weather in a loud environment) may be classified as corresponding to an audio navigation instruction in which the driver correctly responded/was satisfied. The fourth row of training data 300 (having a low level of detail that was played three times at a high volume at a location with GPS coordinates 8.524, 47.365, provided in light traffic at night with overcast conditions in a quiet environment) may be classified as corresponding to an audio navigation instruction in which the driver did not correctly respond.

Then the context-aware audio navigation generator 68 may analyze the first and second subsets to generate the machine learning model. The machine learning model may be generated using various machine learning techniques such as a regression analysis (e.g., a logistic regression, linear regression, or polynomial regression), k-nearest neighbors, decisions trees, random forests, boosting, neural networks, support vector machines, deep learning, reinforcement learning, Bayesian networks, etc. In some embodiments, the context-aware audio navigation generator 68 may generate a first machine learning model for determining the level of detail for an audio navigation instruction. The context-aware audio navigation generator 68 may generate a second machine learning model for determining the timing of providing the audio navigation instruction, and a third machine learning model for determining the volume for the audio navigation instruction.

For example, the machine learning model for determining the timing of providing the audio navigation instruction may be a linear regression model generated using an ordinary least squares method. Based on an analysis of the first and second subsets, the context-aware audio navigation generator 68 may determine that the frequency for the audio navigation instruction is negatively correlated with the amount of traffic and positively correlated with bad weather conditions, such as rain, snow, or fog. Furthermore, the machine learning model for determining the volume of the audio navigation instruction may also be a linear regression model generated using an ordinary least squares method.

In another example, the machine learning model for determining the level of detail for an audio navigation instruction may be support vector machines. In yet another example, a single machine learning model for identifying audio navigation instruction parameters for a particular context may be a decision tree having several nodes connected by branches where each node represents a test on the sensor data (e.g., is the time of day morning or afternoon?), each branch represents the outcome of the test (e.g., Yes), and each leaf represents the audio navigation instructions parameters for the context (e.g., low level of detail, three times, high volume).

More specifically, the context-aware audio navigation generator 68 may generate a decision tree where a first node corresponds to whether the traffic is heavy. If the traffic is not heavy, a first branch may connect to a second node which corresponds to whether the time of day is night. If the time of day is night, a second branch may connect to a third node which corresponds to whether the external environment is loud. If the external environment is loud, a third branch may connect to a leaf node which may indicate that the audio navigation instruction should be presented at a medium level of detail, two times, at a high volume. While the decision tree includes one leaf node and three branches, this is merely an example for ease of illustration only. Each decision tree may include any number of nodes, branches, and leaves, having any suitable number and/or types of tests on sensor data.

Figure 4:
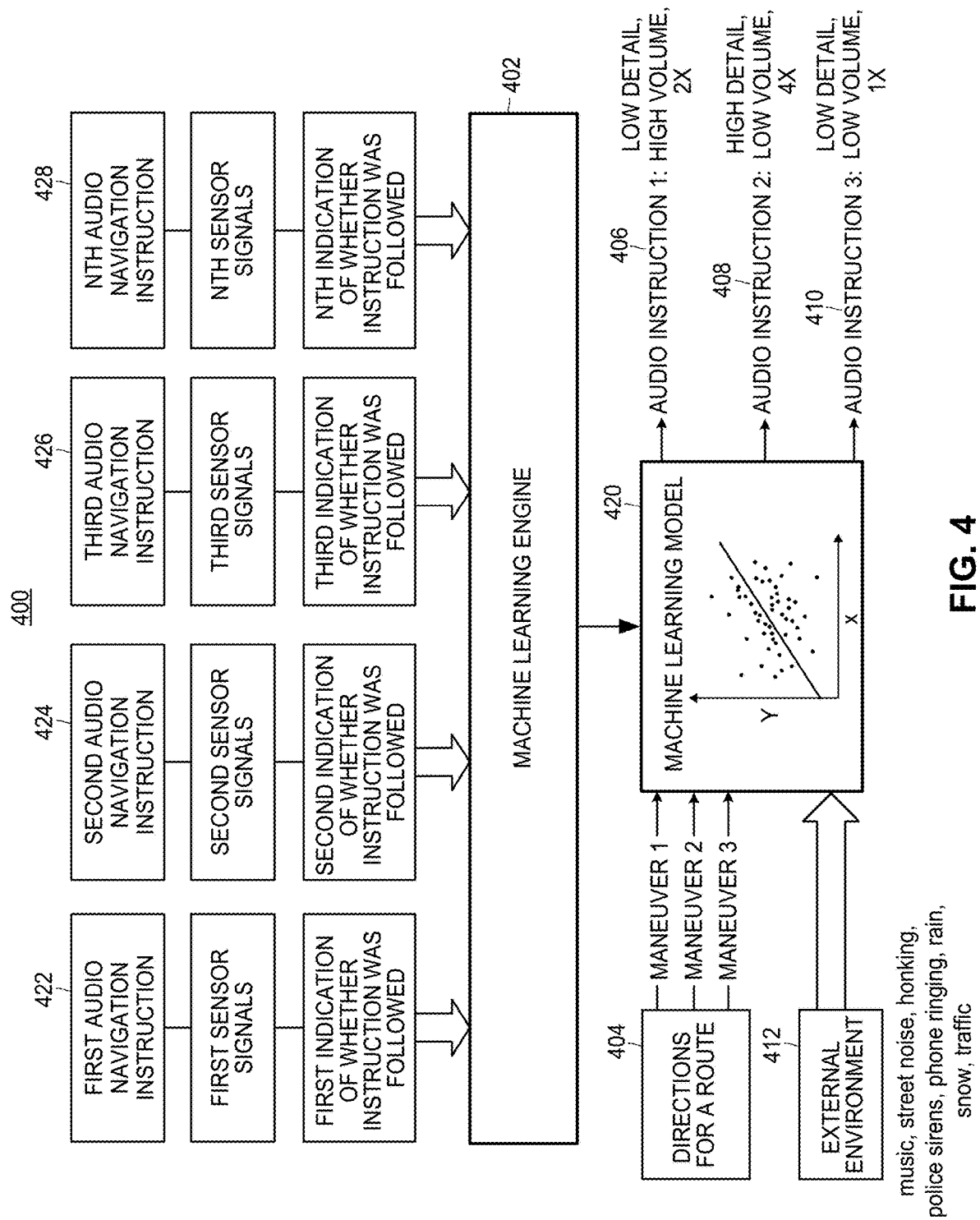
FIG. 4 a combined block and logic diagram that illustrates the generation of context-aware audio navigation instructions using a machine learning model.

Example Logic for Generating Audio Navigation Instructions Using Machine Learning Techniques FIG. 4 schematically illustrates how the context-aware audio navigation generator 68 of FIG. 2 determines the audio navigation instruction parameters for each audio navigation instruction in an example scenario. Some of the blocks in FIG. 4 represent hardware and/or software components (e.g., block 402), other blocks represent data structures or memory storing these data structures, registers, or state variables (e.g., blocks 404, 412, 420), and other blocks represent output data (e.g., blocks 406-410). Input signals are represented by arrows labeled with corresponding signal names.

The machine learning engine 402 of FIG. 4 may be included within the context-aware audio navigation generator 68 to generate the machine learning model 420. To generate the machine learning model 420, the machine learning engine 402 receives training data including a first audio navigation instruction 422 previously provided to a user along with a first set of sensor data when the first audio navigation instruction was provided, and a first indication of whether the user correctly followed the first audio navigation instruction. The training data also includes a second audio navigation instruction 424 previously provided to the same or a different user along with a second set of sensor data when the second audio navigation instruction was provided, and a second indication of whether the user correctly followed the second audio navigation instruction. Furthermore, the training data includes a third audio navigation instruction 426 previously provided to the same or a different user along with a third set of sensor data when the third audio navigation instruction was provided, and a third indication of whether the user correctly followed the third audio navigation instruction. Still further, the training data includes an nth audio navigation instruction 428 previously provided to the same or a different user along with an nth set of sensor data when the nth audio navigation instruction was provided, and an nth indication of whether the user correctly followed the nth audio navigation instruction.

While the example training data includes four audio navigation instructions 422-428 provided to the same or different users, this is merely an example for ease of illustration only. The training data may include any number of audio navigation instructions from any number of users.

The machine learning engine 402 then analyzes the training data to generate a machine learning model 420 for identifying audio navigation instruction parameters for a particular context. In some embodiments, the machine learning engine 402 generates a separate machine learning model for each audio navigation instruction parameter. For example, the machine learning engine 402 may generate a first machine learning model for determining the level of detail for an audio navigation instruction, a second machine learning model for determining the timing of providing the audio navigation instruction, and a third machine learning model for determining the volume for the audio navigation instruction. While the machine learning model 420 is illustrated as a linear regression model, the machine learning model may be another type of regression model such as a logistic regression model, a decision tree, neural network, hyperplane, or any other suitable machine learning model.

In any event, in response to a request for navigation directions by a user, the system of FIG. 4 receives a set of text-based navigation instructions for a route 404 in a file from the navigation server 34, for example. In this example, the set of text-based navigation instructions 404 includes descriptions of maneuvers 1-3, but in general the set of text-based navigation instructions 404 can contain any number of maneuvers. For each text-based navigation instruction, the system receives sensor data indicative of the external environment 412 surrounding the user's client computing device 10. The sensor data may include traffic data for the area surrounding the user's vehicle, visibility data such as the time of day, weather data for the area surrounding the user's vehicle, and/or location data indicative of the location for presenting the audio navigation instruction, audio data indicative of the noise level in or around the vehicle, such as background music or talking in the vehicle, street noise, honking, a phone ringing, etc.

The machine learning engine 402 may then apply the text-based navigation instruction and the sensor data indicative of the external environment 412 to the machine learning model 420 to identify audio navigation instruction parameters for the audio navigation instruction. In other embodiments, the machine learning engine 402 applies the text-based navigation instruction and the sensor data indicative of the external environment 412 to the first machine learning model to identify the level of detail for the audio navigation instruction, the second machine learning model to determine the timing of providing the audio navigation instruction, and the third machine learning model to determine the volume for the audio navigation instruction. For example, for the first maneuver, the machine learning model 420 determines the audio navigation instruction 406 should be generated at a low level of detail and played twice at a high volume. For the second maneuver, the machine learning model 420 determines the audio navigation instruction 408 should be generated at a high level of detail and played four times at a low volume. For the third maneuver, the machine learning model 420 determines the audio navigation instruction 410 should be generated at a low level of detail and played once at a low volume.

In some embodiments, the context-aware audio navigation generator 68 provides the set of text-based navigation instructions to the user's client computing device 10 along with audio navigation instruction parameters for presenting each navigation instruction. In other embodiments, for each text-based navigation instruction, the context-aware audio navigation generator 68 generates a corresponding audio navigation instruction based on the determined audio navigation instruction parameters for the navigation instruction. The context-aware audio navigation generator 68 then provides the set of audio navigation instructions to the user's client computing device 10 to be presented via a speaker.

Also in some embodiments, the context-aware audio navigation generator 68 first provides the entire set of text-based navigation instructions to the user's client computing device 10. In some scenarios, the context-aware audio navigation generator 68 provides multiple versions of the same navigation instruction at different levels of detail for example, to the user's client computing device. More specifically, for the navigation instruction, "Turn right on Main Street," the context-aware audio navigation generator 68 may provide the navigation instruction, "Turn right on Main Street," as a first version of the navigation instruction at a low level of detail. The context-aware audio navigation generator 68 may also provide the navigation instruction, "In X feet, turn right on Main Street," as a second version of the navigation instruction at a medium level of detail. Moreover, the context-aware audio navigation generator 68 may provide the navigation instruction, "In X feet and about Y seconds, turn right at the stop sign next to Joe's Restaurant onto Main Street," as a third version of the navigation instruction at a high level of detail.

Then for each text-based navigation instruction, the context-aware audio navigation generator 68 receives and applies sensor data indicative of the external environment 412 to the machine learning model 420. In turn, the machine learning model 420 generates the audio navigation instruction parameters for the text-based navigation instruction, and the context-aware audio navigation generator 68 provides the audio navigation instruction parameters to the user's client computing device 10. The user's client computing device 10 then applies the audio navigation instruction parameters to the navigation instruction by for example, selecting the version of the navigation instruction corresponding to the level of detail included in the audio navigation instruction parameters. The user's client computing device 10 may also adjust the volume and the timing for the audio navigation instruction based on the audio navigation instruction parameters. Then the user's client computing device 10 presents the generated audio navigation instruction(s) to the user via the speaker 26.

Example Methods for Presenting Context-Aware Audio Navigation Instructions

Figure 5:
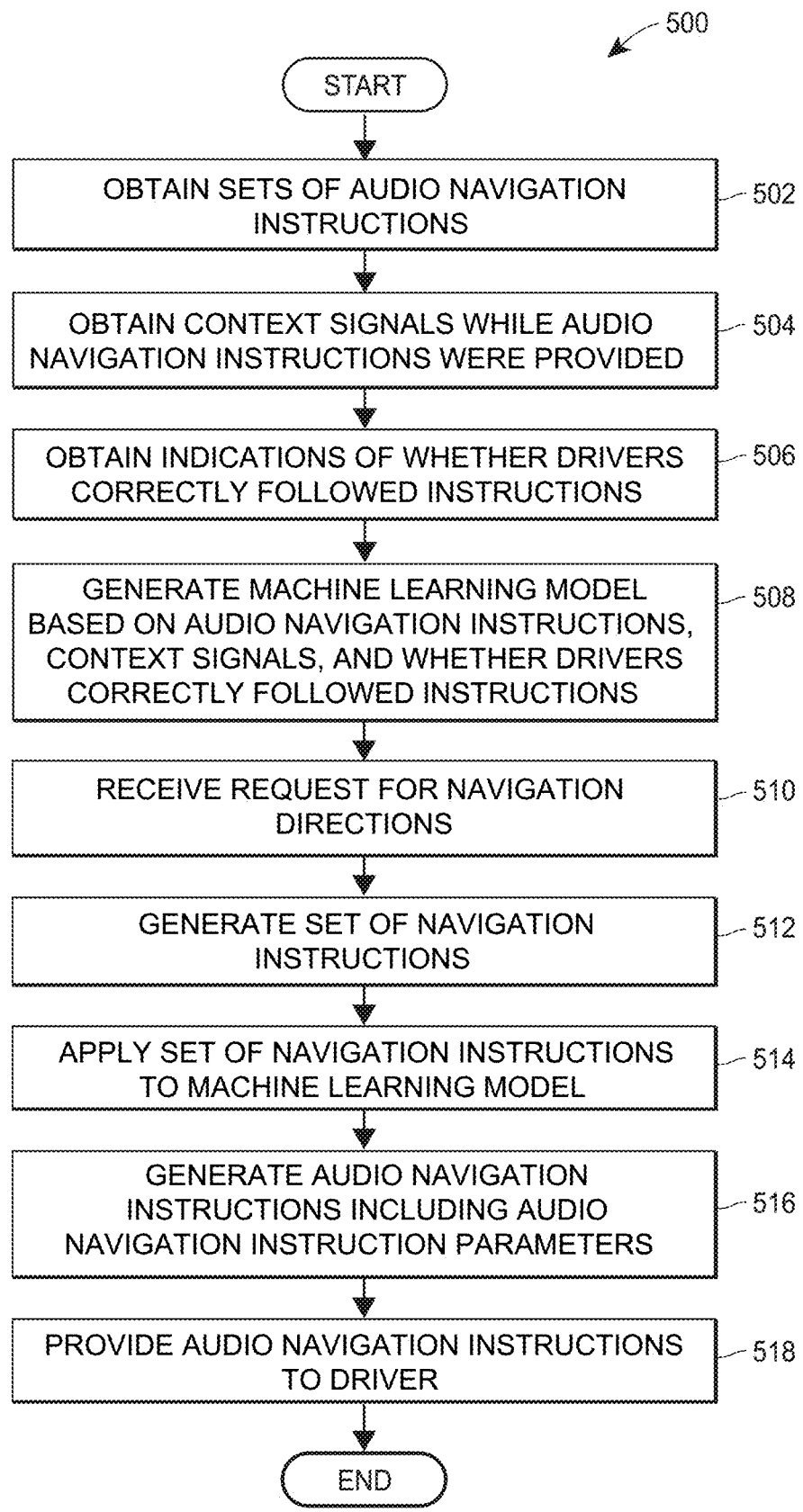
FIG. 5 is a flow diagram of an example method for generating context-aware audio navigation instructions in a vehicle, which can be implemented in a computing device that operates in, or cooperates with, a context-aware audio navigation generation system.

FIG. 5 illustrates a flow diagram of an example method 500 for generating context-aware audio navigation instructions in a vehicle. The method can be implemented in a set of instructions stored on a computer-readable memory and executable at one or more processors of the server device 60. For example, the method can be implemented by the context-aware audio navigation generator 68.

At block 502, training data including sets of audio navigation instructions previously presented to users is obtained during a training period to train a machine learning model to identify audio navigation instruction parameters for a particular context. For each audio navigation instruction, the context-aware audio navigation generator 68 also obtains sensor data as context signals indicative of the external environment surrounding the user's client computing device 10 when the audio navigation instruction was presented (block 504). Additionally, for each audio navigation instruction, the context-aware audio navigation generator 68 obtains an indication of whether a user correctly followed the audio navigation instruction and/or was satisfied with the audio navigation instruction (block 506).

The context-aware audio navigation generator 68 and more specifically, a machine learning engine 402 included within the context-aware audio navigation generator 68 analyzes the training data to generate a machine learning model (block 508), such as the machine learning model 420 as shown in FIG. 4. More specifically, the machine learning engine 402 may classify the training data into a first subset for audio navigation instructions that were correctly followed by the user and the corresponding sensor data and a second subset for audio navigation instructions that were not correctly followed by the user and corresponding sensor data. The two subsets may then be analyzed using various machine learning techniques, such as a regression analysis (e.g., a logistic regression, linear regression, or polynomial regression), k-nearest neighbors, decisions trees, random forests, boosting, neural networks, support vector machines, deep learning, reinforcement learning, Bayesian networks, etc. to generate the machine learning model for identifying audio navigation instruction parameters for a particular context.

In some embodiments, the machine learning engine 402 generates several machine learning models 420 for each of the audio navigation instruction parameters. For example, the machine learning engine 402 may generate a first machine learning model for determining the level of detail for an audio navigation instruction, a second machine learning model for determining the timing of providing the audio navigation instruction, and a third machine learning model for determining the volume for the audio navigation instruction.

In any event, once the machine learning model 420 has been trained and generated, the context-aware audio navigation generator 68 utilizes the machine learning model 420 to generate audio navigation instructions in response to requests for navigation directions from users. More specifically, at block 510 the context-aware audio navigation generator 68 receives a request for navigation directions from a starting location to a destination by a user's client computing device 10. The starting location may be the current location of the client computing device 10. In any event, in response to the request the context-aware audio navigation generator 68 generates a set of navigation instructions (block 512). The set of navigation instructions may be generated in a text format. Additionally, the context-aware audio navigation generator 68 may generate the set of navigation instructions by forwarding the request to the navigation data server 34 and receiving the set of navigation instructions from the navigation data server 34.

In addition to receiving the request for navigation directions from the user's client computing device 10, the context-aware audio navigation generator 68 receives sensor data indicative of the external environment surrounding the user's client computing device 10. For each navigation instruction at block 514, the machine learning engine 402 applies the sensor data to the machine learning model 420 to generate audio navigation instruction parameters for the navigation instruction. The context-aware audio navigation generator 68 then applies the audio navigation instruction parameters to the navigation instruction to generate an audio navigation instruction (block 516) and provides the audio navigation instruction to the user's client computing device 10 (block 518). Accordingly, the user's client computing device 10 presents the audio navigation instruction via a speaker 26.

In other embodiments, the context-aware audio navigation generator 68 provides the set of text-based navigation instructions to the user's client computing device 10 along with audio navigation instruction parameters for presenting each navigation instruction. Then the user's client computing device 10 generates each audio navigation instruction according to the corresponding text-based navigation instruction and audio navigation instruction parameters.

Also in some embodiments, the context-aware audio navigation generator 68 first provides the entire set of text-based navigation instructions to the user's client computing device 10. In some scenarios, the context-aware audio navigation generator 68 provides multiple versions of the same navigation instruction at different levels of detail for example, to the user's client computing device. Then for each text-based navigation instruction, the context-aware audio navigation generator 68 receives and applies sensor data indicative of the external environment 412 to the machine learning model 420. In turn, the machine learning model 420 generates the audio navigation instruction parameters for the navigation instruction, and the context-aware audio navigation generator 68 provides the audio navigation instruction parameters to the user's client computing device 10. The user's client computing device 10 then applies the audio navigation instruction parameters to the text-based navigation instruction by for example, selecting the version of the navigation instruction corresponding to the level of detail included in the audio navigation instruction parameters. The user's client computing device 10 may also adjust the volume and the timing for the audio navigation instruction based on the audio navigation instruction parameters. Then the user's client computing device 10 presents the generated audio navigation instruction(s) to the user via the speaker 26.

In some embodiments, the user's client computing device 10 determines whether the user correctly responded to each of the audio navigation instructions. Then for each audio navigation instruction, the client computing device 10 provides the audio navigation instruction, the sensor data, and an indication of whether the user correctly responded to the audio navigation instruction to the server device 60 as additional training data. The context-aware audio navigation generator 68 may then use the additional training data to update the machine learning model 420 accordingly.

Figure 6:
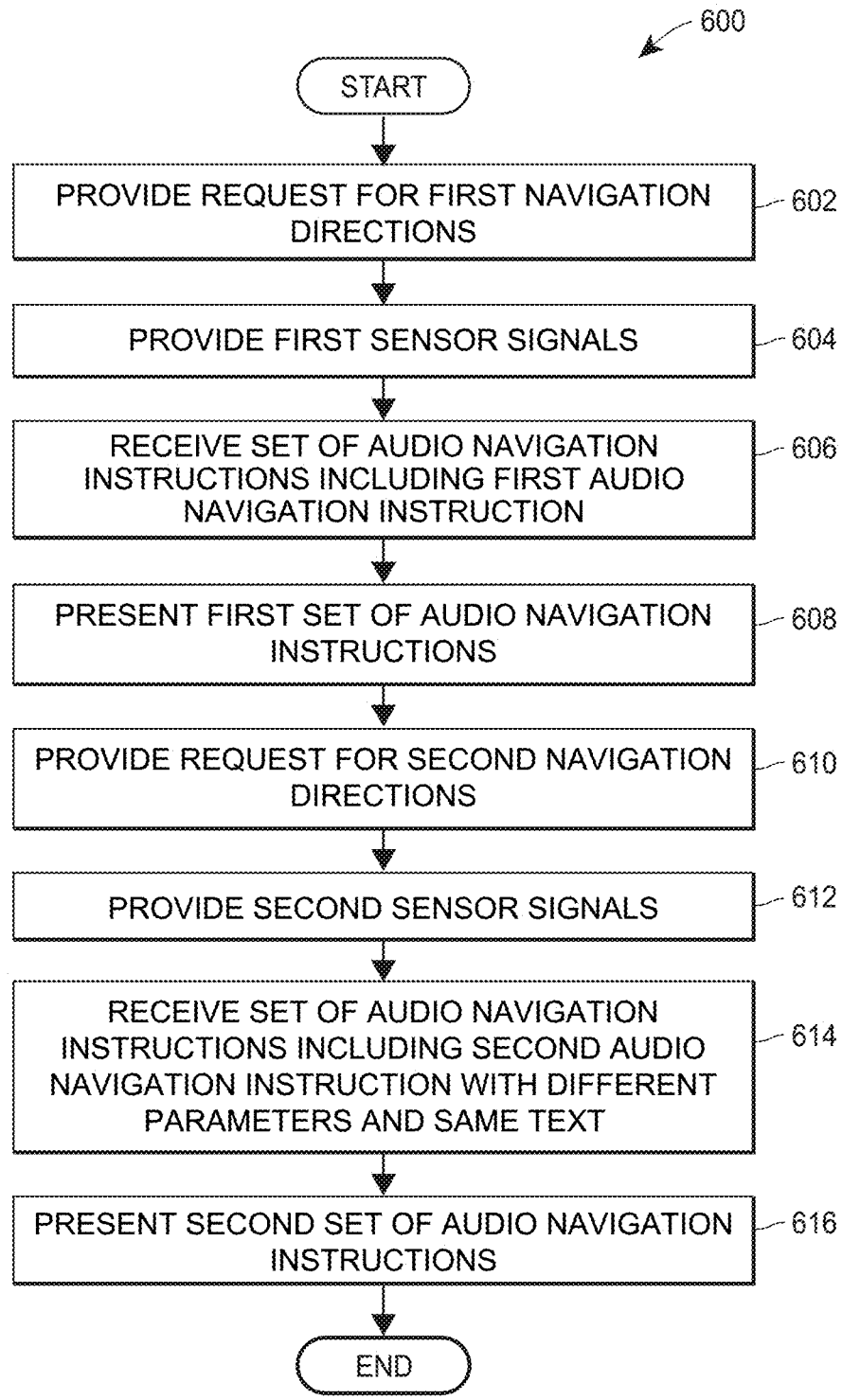
FIG. 6 is a flow diagram of an example method for presenting context-aware audio navigation instructions in a vehicle, which can be implemented in a computing device that operates in, or cooperates with, a context-aware audio navigation generation system.

FIG. 6 illustrates a flow diagram of an example method 600 for presenting context-aware audio navigation instructions in a vehicle. The method can be implemented in a set of instructions stored on a computer-readable memory and executable at one or more processors of the client computing device 10. For example, the method can be implemented by the navigation display 124.

At block 602, in a first instance, the client computing device 10 provides a request for first navigation directions from a first starting location to a first destination. The request may be provided to the server device 60. Furthermore, the request may include a first set of sensor data indicative of the external environment surrounding the client computing device 10 (block 604).

In response to the request, the context-aware audio navigation generator 68 generates a first set of audio navigation instructions including a first audio navigation instruction having a corresponding first text-based navigation instruction. The first text-based navigation instruction includes a particular maneuver (e.g., turn left), location for the maneuver (e.g., at the intersection of State Street and Main Street), and/or direction from which the user approaches the location for the particular maneuver (e.g., heading south down State Street). Additionally, the first audio navigation instruction includes a set of audio navigation instruction parameters, such as a level of detail for the audio navigation instruction, a timing of providing the audio navigation instruction, and a volume for the audio navigation instruction.

In any event, the context-aware audio navigation generator 68 provides the first set to the client computing device 10 (block 606), which in turn presents the first set to the user via a speaker 26 (block 608). In some embodiments, the context-aware audio navigation generator 68 generates the first set of audio navigation instructions by forwarding the request to the navigation data server 34 and receiving the set of text-based navigation instructions from the navigation data server 34. For each text-based navigation instruction, the context-aware audio navigation generator 68 applies the first set of sensor data to the machine learning model 420 to generate audio navigation instruction parameters for the navigation instruction. The context-aware audio navigation generator 68 then applies the audio navigation instruction parameters to the navigation instruction to generate the audio navigation instruction.

At block 610, in a second instance, the client computing device 10 provides a request for second navigation directions from a second starting location to a second destination. The request may be provided to the server device 60. Furthermore, the request may include a second set of sensor data indicative of the external environment surrounding the client computing device 10 (block 612).

In response to the request, the context-aware audio navigation generator 68 generates a second set of audio navigation instructions including a second audio navigation instruction having the same first text-based navigation instruction as in the first instance. More specifically, the first text-based navigation instruction in the second instance includes the same maneuver, location for the maneuver, and/or direction from which the user approaches the location for the particular maneuver, as the first text-based navigation instruction in the first instance. However, the second audio navigation instruction corresponding to the first text-based navigation instruction includes different audio navigation instruction parameters from the first audio navigation instruction in the first instance. For example, the second audio navigation instruction in the second instance may include a different level of detail, timing, or volume from the first audio navigation instruction in the first instance.

In any event, the context-aware audio navigation generator 68 provides the second set to the client computing device 10 (block 614), which in turn presents the second set to the user via a speaker 26 (block 616). In some embodiments, the context-aware audio navigation generator 68 generates the second set of audio navigation instructions by forwarding the request to the navigation data server 34 and receiving the set of text-based navigation instructions from the navigation data server 34. For each text-based navigation instruction, the context-aware audio navigation generator 68 applies the second set of sensor data to the machine learning model 420 to generate audio navigation instruction parameters for the navigation instruction. The context-aware audio navigation generator 68 then applies the audio navigation instruction parameters to the navigation instruction to generate the audio navigation instruction.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output.

Hardware modules may also initiate communications with input or output devices, and can operate on a resource (e.g., a collection of information).

The methods 500 and 600 may include one or more function blocks, modules, individual functions or routines in the form of tangible computer-executable instructions that are stored in a non-transitory computer-readable storage medium and executed using a processor of a computing device (e.g., a server device, a personal computer, a smart phone, a tablet computer, a smart watch, a mobile computing device, or other client computing device, as described herein). The methods 500 and 600 may be included as part of any backend server (e.g., a map data server, a navigation server, or any other type of server computing device, as described herein), client computing device modules of the example environment, for example, or as part of a module that is external to such an environment. Though the figures may be described with reference to the other figures for ease of explanation, the methods 500 and 600 can be utilized with other objects and user interfaces. Furthermore, although the explanation above describes steps of the methods 500 and 600 being performed by specific devices (such as a server device 60 or client computing device 10), this is done for illustration purposes only. The blocks of the methods 500 and 600 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for providing context-aware audio navigation instructions through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating context-aware audio navigation instructions in a vehicle, the method comprising:
 training, by one or more processors, a machine learning model for identifying a plurality of audio navigation instruction parameters for a particular context using (i) a plurality of sensor signals in the vehicle, the sensor signals being descriptive of a context in which audio navigation instructions are provided, and (ii) an indication of whether a driver correctly responded to the audio navigation instructions, wherein the sensor signals descriptive of the context include at least one of: (i) visibility data indicative of weather conditions surrounding the vehicle or a time of day, (ii) audio data indicative of noise levels at or around the vehicle or (iii) traffic data indicative of traffic conditions surrounding the vehicle;
 determining, by the one or more processors, a navigation instruction to be provided to a user;
 generating, by the one or more processors, an audio navigation instruction based on the determined navigation instruction, including:
  receiving one or more sensor signals, and
  applying the machine learning model to the determined navigation instruction and the received one or more sensor signals to generate at least one audio navigation instruction parameter for the audio navigation instruction, wherein the audio navigation instruction is generated with at least one of: a high level of detail including a landmark as a location for a maneuver, or a low level of detail including an intersection as the location for the maneuver, wherein the low level of detail is lower than the high level of detail; and
 providing the audio navigation instruction for presenting to the user via a speaker, wherein the audio navigation instruction is dynamically and automatically adapted to the context in real-time.

2. The method of claim 1, wherein the at least one audio navigation instruction parameter includes at least one of (i) a level of detail of the audio navigation instruction, (ii) a timing of providing the audio navigation instruction, or (iii) a volume of the audio navigation instruction.

3. The method of claim 2, wherein applying the machine learning model to generate the timing of providing the audio navigation instruction includes applying the machine learning model to generate a frequency at which to provide two or more instances of the audio navigation instruction.

4. The method of claim 1, further comprising:
 in response to providing the audio navigation instruction to the user, determining whether the user correctly responded to the audio navigation instruction; and
 providing the audio navigation instruction, the one or more sensor signals, and an indication of whether the user correctly responded to the audio navigation instruction to the machine learning model as training data.

5. The method of claim 4, further comprising:
 updating the machine learning model based on the provided training data.

6. The method of claim 1, wherein training the machine learning model includes training a plurality of machine learning models for generating audio navigation instructions, including two or more of: a first machine learning model for determining a level of detail of the audio navigation instruction, a second machine learning model for determining a timing of the audio navigation instruction, or a third machine learning model for determining a volume of the audio navigation instruction.

7. The method of claim 6, wherein applying the machine learning model to the determined navigation instruction and the received one or more sensor signals includes at least one of:
   applying the first machine learning model to the determined navigation instruction and the received one or more sensor signals to generate the level of detail of the audio navigation instruction;
   applying the second machine learning model to the determined navigation instruction and the received one or more sensor signals to generate the timing of providing the audio navigation instruction; or
   applying the third machine learning model to the determined navigation instruction and the received one or more sensor signals to generate the volume of providing the audio navigation instruction.

8. A server device for generating context-aware audio navigation instructions in a vehicle, the server device comprising:
   one or more processors; and
   a non-transitory computer-readable memory coupled to the one or more processors and storing instructions thereon that, when executed by the one or more processors, cause the server device to:
      train a machine learning model for identifying a plurality of audio navigation instruction parameters for a particular context using (i) a plurality of sensor signals in the vehicle, the sensor signals being descriptive of a context in which audio navigation instructions are provided, and (ii) an indication of whether a driver correctly responded to the audio navigation instructions, wherein the sensor signals descriptive of the context include at least one of: (i) visibility data indicative of weather conditions surrounding the vehicle or a time of day, (ii) audio data indicative of noise levels at or around the vehicle or (iii) traffic data indicative of traffic conditions surrounding the vehicle;
      determine a navigation instruction to be provided to a user;
      generate an audio navigation instruction based on the determined navigation instruction, including:
         receive one or more sensor signals, and
         apply the machine learning model to the determined navigation instruction and the received one or more sensor signals to generate at least one audio navigation instruction parameter for the audio navigation instruction, wherein the audio navigation instruction is generated with at least one of: a high level of detail including a landmark as a location for a maneuver, or a low level of detail including an intersection as the location for the maneuver, wherein the low level of detail is lower than the high level of detail; and
      provide the audio navigation instruction for presenting to the user via a speaker, wherein the audio navigation instruction is dynamically and automatically adapted to the context in real-time.

9. The server device of claim 8, wherein the at least one audio navigation instruction parameter includes at least one of (i) a level of detail of the audio navigation instruction, (ii) a timing of providing the audio navigation instruction, or (iii) a volume of the audio navigation instruction.

10. The server device of claim 9, wherein the timing of providing the audio navigation instruction includes a frequency at which to provide two or more instances of the audio navigation instruction.

11. The server device of claim 8, wherein the instructions further cause the server device to:
   in response to providing the audio navigation instruction to the user, determine whether the user correctly responded to the audio navigation instruction; and
   provide the audio navigation instruction, the one or more sensor signals, and an indication of whether the user correctly responded to the audio navigation instruction to the machine learning model as training data.

12. The server device of claim 11, wherein the instructions further cause the server device to:
   update the machine learning model based on the provided training data.

13. The server device of claim 8, wherein the machine learning model includes a plurality of machine learning models for generating audio navigation instructions, including two or more of: a first machine learning model for determining a level of detail of the audio navigation instruction, a second machine learning model for determining a timing of the audio navigation instruction, or a third machine learning model for determining a volume of the audio navigation instruction.

14. The server device of claim 13, wherein to apply the machine learning model to the determined navigation instruction and the received one or more sensor signals, the instructions cause the server device to at least one of:
   apply the first machine learning model to the determined navigation instruction and the received one or more sensor signals to generate the level of detail of the audio navigation instruction;
   apply the second machine learning model to the determined navigation instruction and the received one or more sensor signals to generate the timing of providing the audio navigation instruction; or
   apply the third machine learning model to the determined navigation instruction and the received one or more sensor signals to generate the volume of providing the audio navigation instruction.

15. A non-transitory computer-readable memory storing instructions thereon that, when executed by one or more processors, cause the one or more processors to:
   train a machine learning model for identifying a plurality of audio navigation instruction parameters for a particular context using (i) a plurality of sensor signals in the vehicle, the sensor signals being descriptive of a context in which audio navigation instructions are provided, and (ii) an indication of whether a driver correctly responded to the audio navigation instructions, wherein the sensor signals descriptive of the context include at least one of: (i) visibility data indicative of weather conditions surrounding the vehicle or a time of day, (ii) audio data indicative of noise levels at or around the vehicle or (iii) traffic data indicative of traffic conditions surrounding the vehicle;
   determine a navigation instruction to be provided to a user;
   generate an audio navigation instruction based on the determined navigation instruction, including:

receive one or more sensor signals, and
apply the machine learning model to the determined navigation instruction and the received one or more sensor signals to generate at least one audio navigation instruction parameter for the audio navigation instruction, wherein the audio navigation instruction is generated with at least one of: a high level of detail including a landmark as a location for a maneuver, or a low level of detail including an intersection as the location for the maneuver, wherein the low level of detail is lower than the high level of detail; and
provide the audio navigation instruction for presenting to the user via a speaker, wherein the audio navigation instruction is dynamically and automatically adapted to the context in real-time.

16. The non-transitory computer-readable memory of claim 15, wherein the at least one audio navigation instruction parameter includes at least one of (i) a level of detail of the audio navigation instruction, (ii) a timing of providing the audio navigation instruction, or (iii) a volume of the audio navigation instruction.

17. The non-transitory computer-readable memory of claim 16, wherein the timing of providing the audio navigation instruction includes a frequency at which to provide two or more instances of the audio navigation instruction.

18. The non-transitory computer-readable memory of claim 15, wherein the instructions further cause the one or more processors to:
in response to providing the audio navigation instruction to the user, determine whether the user correctly responded to the audio navigation instruction; and
provide the audio navigation instruction, the one or more sensor signals, and an indication of whether the user correctly responded to the audio navigation instruction to the machine learning model as training data.

19. The non-transitory computer-readable memory of claim 18, wherein the instructions further cause the one or more processors to:
update the machine learning model based on the provided training data.

20. The non-transitory computer-readable memory of claim 15, wherein the machine learning model includes a plurality of machine learning models for generating audio navigation instructions, including two or more of: a first machine learning model for determining a level of detail of the audio navigation instruction, a second machine learning model for determining a timing of the audio navigation instruction, or a third machine learning model for determining a volume of the audio navigation instruction.

* * * * *